US011729486B2

(12) United States Patent
Matsuno et al.

(10) Patent No.: US 11,729,486 B2
(45) Date of Patent: Aug. 15, 2023

(54) IMAGE CAPTURE APPARATUS AND CONTROL METHOD OF THE SAME

(71) Applicant: CANON KABUSHIKI KAISHA, Tokyo (JP)

(72) Inventors: Taro Matsuno, Tokyo (JP); Nobuyuki Horie, Tokyo (JP); Fumihiro Kajimura, Tokyo (JP); Masahiro Aimi, Kawasaki (JP); Shun Kawada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 282 days.

(21) Appl. No.: 16/821,278

(22) Filed: Mar. 17, 2020

(65) Prior Publication Data

US 2020/0304696 A1   Sep. 24, 2020

(30) Foreign Application Priority Data

Mar. 19, 2019 (JP) ................. 2019-051509

(51) Int. Cl.
*H04N 23/60* (2023.01)
*G10L 25/78* (2013.01)
*G10L 15/02* (2006.01)

(52) U.S. Cl.
CPC ............ *H04N 23/60* (2023.01); *G10L 15/02* (2013.01); *G10L 25/78* (2013.01)

(58) Field of Classification Search
CPC .............. H04N 5/232; H04N 5/23219; H04N 5/232933; H04N 5/772; H04N 9/8205;

(Continued)

(56) References Cited

U.S. PATENT DOCUMENTS 5,570,151 A * 10/1996 Terunuma .............. G03B 17/38
396/502
2005/0128311 A1* 6/2005 Rees ...................... G03B 17/38
348/E5.042

(Continued)

FOREIGN PATENT DOCUMENTS

JP    2000-221582 A    8/2000
JP    2012-185343 A    9/2012
JP    2013-058996 A    3/2013

OTHER PUBLICATIONS

The above foreign patent documents were cited in the Jan. 6, 2023 Japanese Office Action, which is enclosed without an English Translation, that issued in Japanese Patent Application No. 2019-051509.

*Primary Examiner* — Kelly L Jerabek
(74) *Attorney, Agent, or Firm* — Cowan, Liebowitz & Latman, P.C.

(57) ABSTRACT

An image capture apparatus having a speech recognition function, when a detector has detected an eye approach state with respect to a viewfinder, recognizes input speech using the speech recognition function, makes settings of the image capture apparatus based on the recognized speech, makes settings of the image capture apparatus according to an operation accepted via an operation unit, and distinguishably displays the settings of the image capture apparatus made based on speech, and the settings of the image capture apparatus made according to an operation accepted via the operation unit, on the viewfinder.

11 Claims, 8 Drawing Sheets

(58) Field of Classification Search
CPC .... H04N 23/60; H04N 23/611; H04N 23/631; H04N 23/633; G10L 15/02; G10L 25/78; G10L 15/22; G10L 2015/223; G10L 2015/227

See application file for complete search history.

(56) References Cited

U.S. PATENT DOCUMENTS

| | | | |
|---|---|---|---|
| 2007/0086764 A1* | 4/2007 | Konicek | G10L 17/22 348/E5.042 |
| 2013/0304479 A1* | 11/2013 | Teller | G06F 3/167 704/E21.001 |
| 2016/0227095 A1* | 8/2016 | Yoshizawa | H04N 5/23203 |
| 2019/0294239 A1* | 9/2019 | Suzuki | G06F 3/013 |

* cited by examiner

IMAGE CAPTURE APPARATUS AND CONTROL METHOD OF THE SAME

BACKGROUND OF THE INVENTION

Field of the Invention

The present invention relates to an image capture apparatus that has a speech recognition function.

Description of the Related Art

Japanese Patent Laid-Open No. 2012-185343 discloses an image capture apparatus that, while the user is half-pressing a shutter button, records speech sound data, which triggers speech recognition, in an image capture apparatus, performs speech recognition using the trigger, and executes shooting.

According to Japanese Patent Laid-Open No. 2012-185343, a trigger for speech recognition is a registered speech sound data, and the user needs to first utter a predetermined speech sound, and thereafter utter a speech sound that is actually desired to be subjected to speech recognition. Therefore, speech recognition cannot be smoothly performed, and thus user convenience is degraded.

SUMMARY OF THE INVENTION

The present invention has been made in consideration of the aforementioned problems, and realizes techniques for making it possible to more easily use a speech recognition function.

In order to solve the aforementioned problems, the present invention provides an image capture apparatus having a speech recognition function, comprising: a viewfinder; a detector; an operation unit; and one or more processors configured to function as a control unit, a setting unit, and a display unit, wherein the control unit is configured to, when the detector has detected an eye approach state with respect to the viewfinder, recognize input speech using the speech recognition function, and make settings of the image capture apparatus based on the recognized speech, the setting unit is configured to make settings of the image capture apparatus according to an operation accepted via the operation unit, and the display unit is configured to distinguishably display the settings of the image capture apparatus made by the control unit based on speech, and the settings of the image capture apparatus made by the setting unit according to an operation accepted via the operation unit, on the viewfinder.

In order to solve the aforementioned problems, the present invention provides a method of controlling an image capture apparatus having a speech recognition function, a viewfinder, a detector, and an operation unit, the method comprising: recognizing input speech using the speech recognition function when the detector has detected an eye approach state with respect to the viewfinder; making settings of the image capture apparatus based on the recognized speech; making settings of the image capture apparatus according to an operation accepted via the operation unit; and distinguishably displaying the settings of the image capture apparatus made based on the recognized speech, and the settings of the image capture apparatus made according to an operation accepted via the operation unit, on the viewfinder.

In order to solve the aforementioned problems, the present invention provides a non-transitory computer-readable storage medium storing a program that causes a computer to execute a method of controlling an image capture apparatus having a speech recognition function, a viewfinder, a detector, and an operation unit, the method comprising: recognizing input speech using the speech recognition function when the detector has detected an eye approach state with respect to the viewfinder; making settings of the image capture apparatus based on the recognized speech; making settings of the image capture apparatus according to an operation accepted via the operation unit; and distinguishably displaying the settings of the image capture apparatus made based on the recognized speech, and the settings of the image capture apparatus made according to an operation accepted via the operation unit, on the viewfinder.

In order to solve the aforementioned problems, the present invention provides an image capture apparatus having a speech recognition function, comprising: an operation unit; and one or more processors configured to function as a control unit, a setting unit, and a display unit, wherein the control unit is configured to, when a predetermined condition is satisfied, recognize input speech using the speech recognition function, and make settings of the image capture apparatus based on the recognized speech, the setting unit is configured to make settings of the image capture apparatus according to an user operation accepted via the operation unit, and the display unit is configured to distinguishably display the settings of the image capture apparatus made by the control unit based on speech, and the settings of the image capture apparatus made by the setting unit according to an operation accepted via the operation unit.

In order to solve the aforementioned problems, the present invention provides a method of controlling an image capture apparatus having a speech recognition function, and an operation unit, the method comprising: recognizing input speech using the speech recognition function when a predetermined condition is satisfied; making settings of the image capture apparatus based on the recognized speech; making settings of the image capture apparatus according to an operation accepted via the operation unit; and distinguishably displaying the settings of the image capture apparatus made based on the recognized speech, and the settings of the image capture apparatus made according to an operation accepted via the operation unit.

In order to solve the aforementioned problems, the present invention provides a non-transitory computer-readable storage medium storing a program that causes a computer to execute a method of controlling an image capture apparatus having a speech recognition function, and an operation unit, the method comprising: recognizing input speech using the speech recognition function when a predetermined condition is satisfied; making settings of the image capture apparatus based on the recognized speech; making settings of the image capture apparatus according to an operation accepted via the operation unit; and distinguishably displaying the settings of the image capture apparatus made based on the recognized speech, and the settings of the image capture apparatus made according to an operation accepted via the operation unit.

According to the present invention, the user can more easily use a speech recognition function.

Further features of the present invention will become apparent from the following description of exemplary embodiments (with reference to the attached drawings).

DESCRIPTION OF THE EMBODIMENTS

Figure 1:
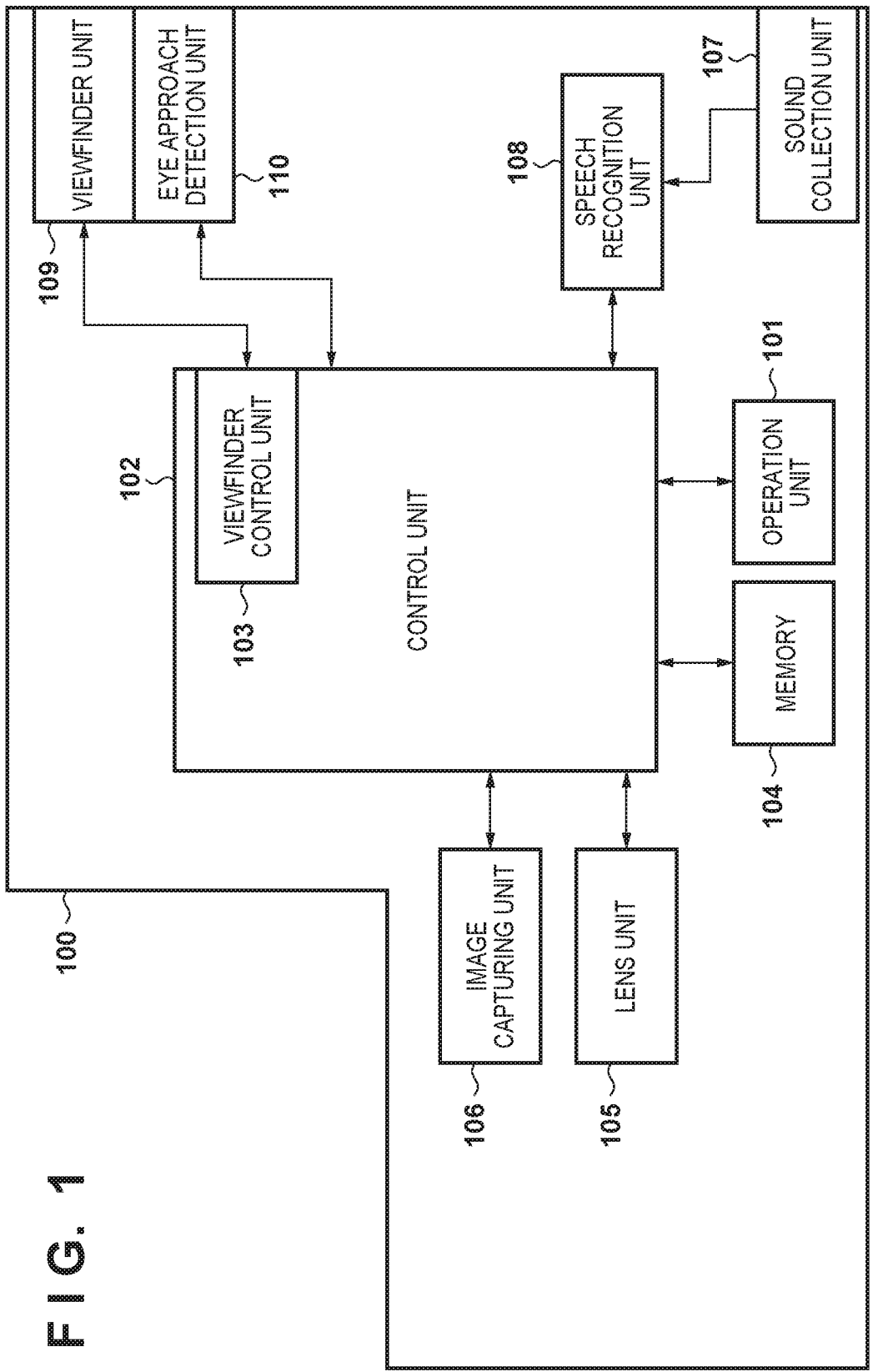
FIG. 1 is a block diagram showing an apparatus configuration according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The following describes a first embodiment with reference to FIG. 1.

Apparatus Configuration

First, an image capture apparatus 100 according to the first embodiment will be described with reference to FIG. 1.

Although the present embodiment describes an image capture apparatus that can capture a sill image or a moving image, such as a digital camera, the present invention is not limited in this way, and may be an information processing apparatus having a camera function, such as a tablet device or a personal computer, a surveillance camera, a medical camera, or the like.

The image capture apparatus 100 includes an operation unit 101, a control unit 102, a viewfinder control unit 103, a memory 104, a lens unit 105, an image capturing unit 106, a sound collection unit 107, a speech recognition unit 108, a viewfinder unit 109, and an eye approach detection unit 110.

The operation unit 101 includes operation members that accept various operations from a user, such as various kinds of switches, buttons, dials, levers, and touch panels. The operation unit 101 transmits a user operation to the control unit 102. The operation unit 101 includes a power switch, a shutter button, a setting dial for performing various settings on the camera, a four-way bottom, and so on (not shown). The operation unit 101 transmits a user operation to the control unit 102. The user can operate the image capture apparatus 100 and perform various settings regarding the image capture apparatus 100 by operating the operation unit 101.

The control unit 102 includes a CPU or an MPU that controls the entire image capture apparatus 100, a ROM, a RAM, and so on, and performs each processing step of the flowchart described below by executing a program stored in the ROM. The RAM is also used as a work memory onto which constants, variables, a program read out from the ROM, and so on, which are used to operate the control unit 102, are loaded. The ROM stores information such as the content of settings changed by voice input at the time of shooting, and the content of settings manually input. The control unit 102 also has the function of the viewfinder control unit 103 that performs display control on the viewfinder unit 109.

The viewfinder control unit 103 displays setting information, an operation status, and so on regarding the image capture apparatus 100, on a display screen of the viewfinder unit 109. Also, the viewfinder control unit 103 can display image data that has been subjected to image processing performed by the control unit 102, on the viewfinder unit 109. In the present embodiment, the viewfinder control unit 103 is one of the functional blocks included in the control unit 102. However, the present invention is not limited in this way, and the viewfinder control unit 103 may be separately provided as a processor chip that communicates with the control unit 102, for example.

The memory 104 includes a RAM chip and so on, and stores various kinds of data such as image data that has been subjected to image processing performed by the control unit 102.

The lens unit 105 includes a lens group that includes at least one optical lens, and a drive unit for driving the lens group. The lens unit 105 forms the object image on an imaging surface of the image capturing unit 106.

The image capturing unit 106 includes a shutter that has a diaphragm function, an imaging device that is constituted by a CCD or CMOS device or the like and converts the object image formed by the lens unit 105 into electrical signals, and an A/D convertor that converts analogue image signals output from the imaging device into digital signals. The image capturing unit 106, under the control of the control unit 102, converts the object image formed by the lens included in the image capturing unit 106, into electrical signals, using the imaging device, performs noise reduction processing or the like, and thus outputs captured image data that is constituted by digital signals.

The control unit 102 generates image data by performing various kinds of image processing on the captured image data output from the image capturing unit 106, and records it on a recording medium such as a memory card or a hard disk (not shown). Also, the control unit 102 performs AF (autofocus) processing or AE (auto exposure) processing by performing predetermined calculation processing using image data, and controlling the lens unit 105 and the diaphragm/shutter of the image capturing unit 106 based on the obtained result of calculation.

The sound collection unit 107 is a microphone that inputs sound collected around the image capture apparatus 100. The sound collection unit 107 collects sound around the image capture apparatus 100, and inputs the sound to the speech recognition unit 108 as audio signals.

The speech recognition unit 108 can recognize audio signals input from the sound collection unit 107, and has a library, a communication function, and a calculation function that enable the speech recognition unit 108 to perform various speech recognition algorithms. The speech recognition unit 108 can recognize settings and an instruction intended by the user, from audio signals transmitted from the sound collection unit 107, using a speech recognition algorithm, and transmits the result of recognition to the control unit 102.

The viewfinder unit 109 allows the user to visually observe the object by bringing their eye close to it and looking into it.

The eye approach detection unit 110 can detect a state in which the user's eye has approached a position that is at a predetermined distance from the viewfinder unit 109, or has brought into contact with the viewfinder unit 109 (hereinafter referred to as an eye approach state). Upon detecting the user's eye approach state, the viewfinder unit 109 transmits the result of detection to the control unit 102.

Note that power is supplied from a power supply (not shown) to each component of the image capture apparatus 100, and each component operates using the supplied power.

Processing at the time of Shooting Next, processing performed at the time of shooting according to the first embodiment will be described with reference to FIG. 2.

Figure 2:
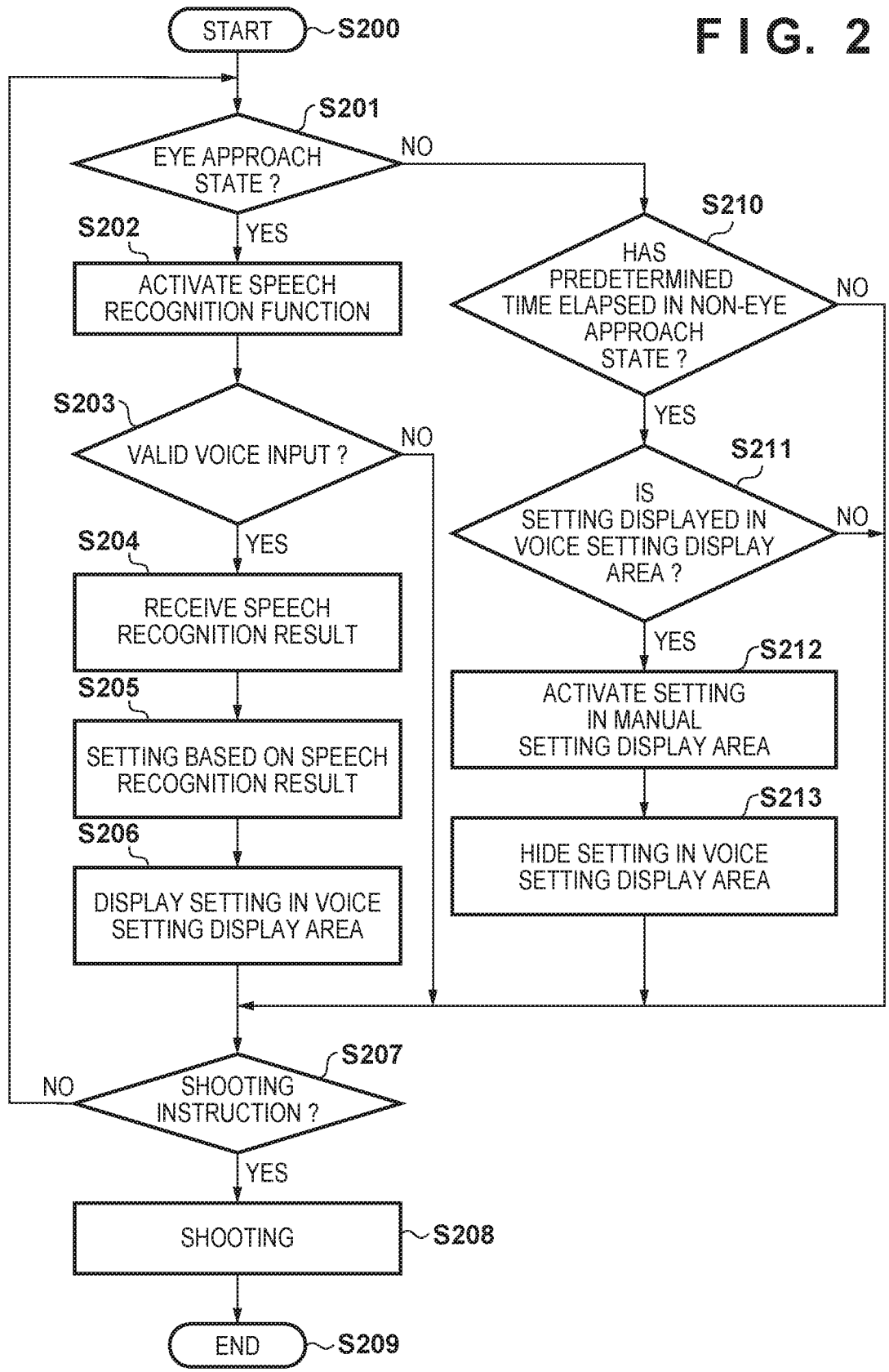
FIG. 2 is a flowchart showing processing performed at the time of shooting according to the first embodiment.

Note that the processing shown in FIG. 2 is realized by the control unit 102 executing a program stored in the ROM. The same applies to FIGS. 5A, 5B and 7 described below.

In the following description, each component connected to the control unit 102 operates in response to a control signal received from the control unit 102, unless otherwise specifically described.

In step S200, upon the user powering ON the image capture apparatus 100 and setting the operation mode of the image capture apparatus 100 to a shooting mode, or upon the user powering ON the image capture apparatus 100 that was previously powered OFF when the operation mode thereof was the shooting mode, the control unit 102 sets the operation mode of the image capture apparatus 100 to the shooting mode and starts shooting processing. The user points the image capture apparatus 100 at the object, the image capturing unit 106 captures an image of the object, and the captured image is displayed on the viewfinder unit 109. In this case, the user completes setting of the image capture apparatus 100 using the operation unit 101, and setting information regarding the image capture apparatus 100 is displayed in a manual setting display area 302 of the viewfinder unit 109 shown in FIG. 3A. The details of FIG. 3A will be described later.

In step S201, the control unit 102 detects the eye approach state of the user, using the eye approach detection unit 110. The control unit 102 receives the result of detection from the eye approach detection unit 110. Upon determining that the eye approach state of the user has been detected, the control unit 102 moves processing to step S202, and upon determining that the eye approach state has not been detected, the control unit 102 moves processing to step S210.

In step S202, the control unit 102 activates the speech recognition function because the eye approach state of the user has been detected. Upon the speech recognition function being activated, the sound collection unit 107 is started up so that sound around the image capture apparatus 100, such as the user's voice, can be input thereto. The speech recognition unit 108 discerns whether or not the audio signals transmitted from the sound collection unit 107 form valid speech sound, using a speech recognition algorithm. Note that processing may be performed using a model learned through machine learning, instead of the above-described speech recognition algorithm for the speech recognition unit 108. If this is the case, for example, a plurality of data sets each consisting of input data and output data for the speech recognition unit are prepared as learning data, and a learned model that has acquired knowledge through machine learning using the learning data, and that outputs output data as a result corresponding to input data based on the acquired knowledge, is generated. The learning model may be constituted by a neural network model, for example. The learned model cooperates with a CPU or a GPU as a program for performing processing that is equivalent to the processing performed by the above-described speech recognition unit, to perform the above-described processing. Note that the above-described learning model may be updated as appropriate after predetermined processing has been completed.

In step S203, the control unit 102 determines whether or not the speech recognition unit 108 has discerned that the audio signals input from the sound collection unit 107 form valid speech sound. If the speech recognition unit 108 discerns that the audio signals form valid speech sound, the control unit 102 moves processing to step S204, and if the speech recognition unit 108 discerns that the audio signals do not form valid speech sound, the control unit 102 moves processing to step S206. Valid speech sound means speech of which the result of speech recognition performed by the speech recognition unit 108 brings about an operation or setting of the image capture apparatus 100. Although there are various algorithms for the determination method, any method may be employed without any specific limitation as long as it is possible to determine whether or not valid speech sound has been input.

In step S204, the control unit 102 receives the result of speech recognition from the speech recognition unit 108 because the audio signals input from the sound collection unit 107 have been determined as valid speech sound.

In step S205, the control unit 102 makes settings of the image capture apparatus 100 based on the result of speech recognition received from the speech recognition unit 108.

Figure 3A:
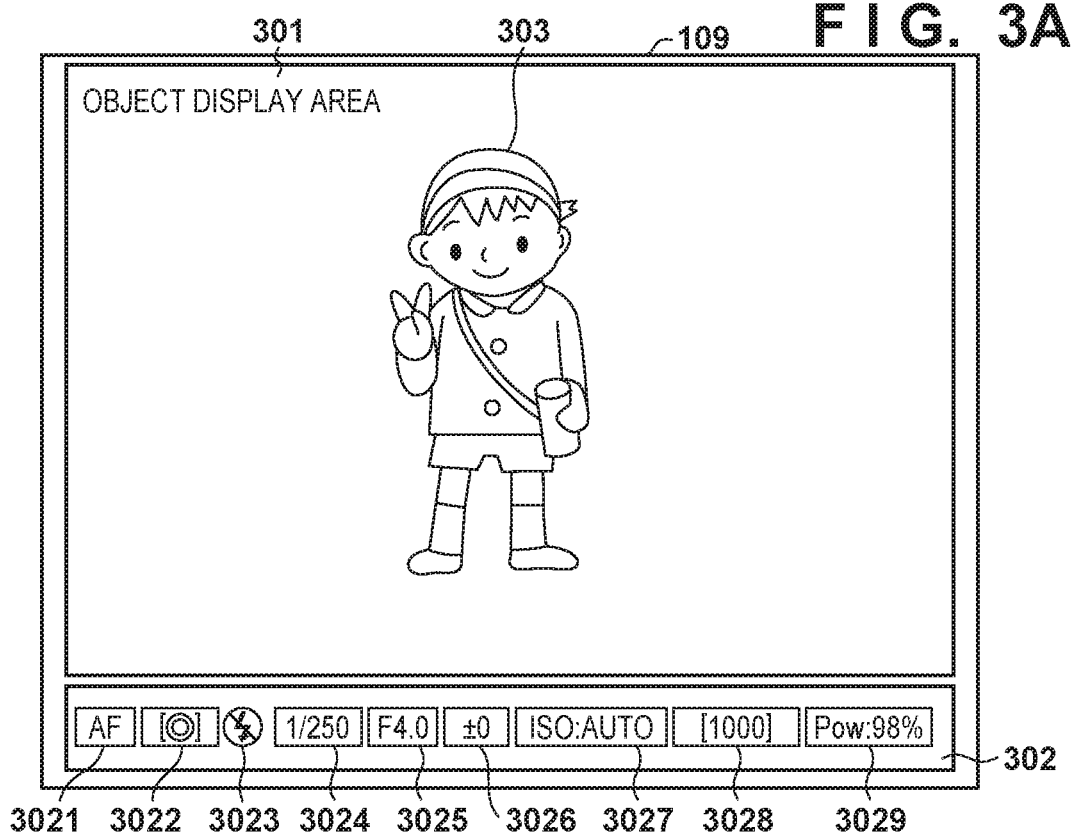
FIGS. 3A and 3B are diagrams showing examples of content displayed by a viewfinder according to the first embodiment.
Figure 3B:
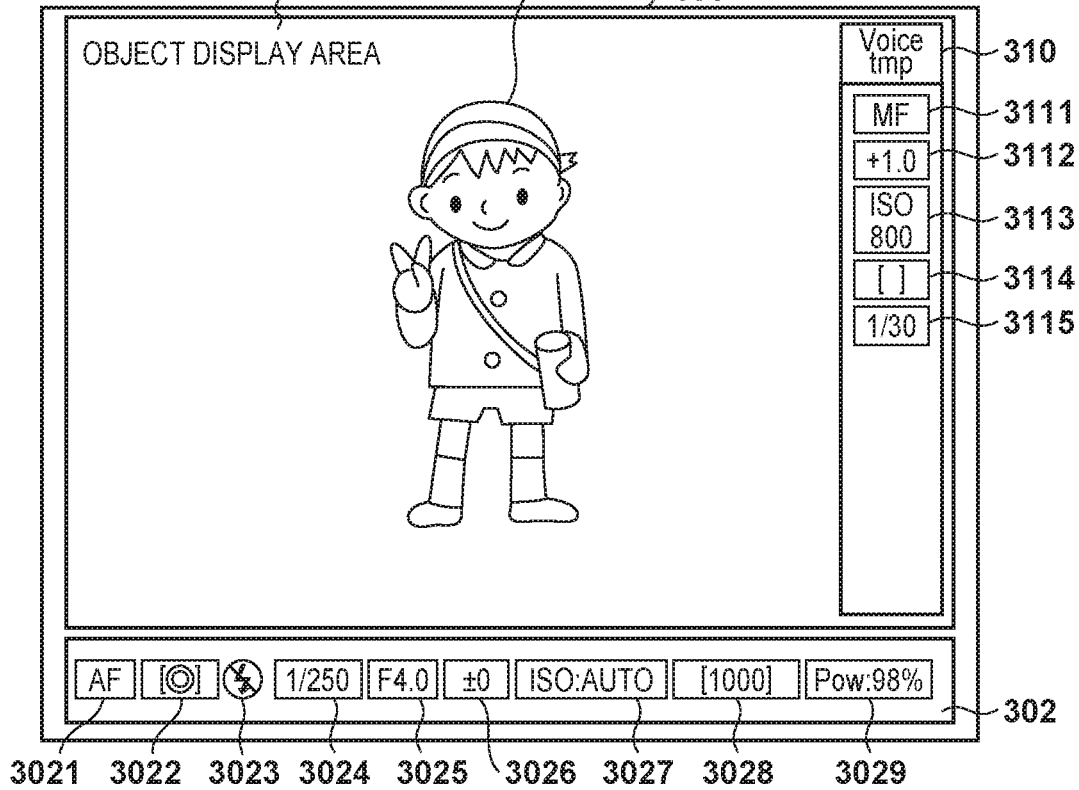

In step S206, using the viewfinder control unit 103, the control unit 102 displays the content of the settings of the image capture apparatus 100 made by the control unit 102, in a voice setting display area 310 of the viewfinder unit 109 shown in FIG. 3B. The content of voice input settings by the user is displayed in the voice setting display area 310 of the viewfinder unit 109, which enables the user to easily check the settings discerned through speech recognition. Details of FIG. 3B will be described later.

In step S207, the control unit 102 determines whether or not a shooting instruction has been input from the user. Upon determining that a shooting instruction has been input, the control unit 102 advances processing to step S208, and upon determining that a shooting instruction has not been input, the control unit 102 returns processing to step S201. A shooting instruction is transmitted to the control unit 102 upon the user operating the shutter button, for example, of the operation unit 101.

In step S208, the control unit 102 controls each component of the image capture apparatus 100 according to the shooting instruction from the user, to perform shooting processing. Although the details of shooting processing are omitted, generally the following processing is performed.

Upon receiving a shooting instruction from the user, the image capturing unit 106 converts the analogue signals, which are electrical signals converted from the object image light incident to the image capturing unit 106 from the lens unit 105, into digital signals, and transmits them to the control unit 102 as captured image data. The control unit 102 temporarily stores the captured image data received from the image capturing unit 106 in the memory 104, sequentially performs image processing thereon to generate final image data, and records the final data on a recording medium such as a memory card or a hard disk (not shown). Upon the series of processing from image capturing to recording being complete, the control unit 102 advances processing to step S209, and terminates shooting processing.

In step S210, the control unit 102 determines whether or not a predetermined period of time has elapsed in a non-eye approach state in which the user's eye approach state has not been detected by the eye approach detection unit 110. Upon determining that the predetermined period of time has elapsed in the non-eye approach state, the control unit 102 advances processing to step S211, and upon determining that the predetermined period of time has not elapsed, the control unit 102 advances processing to step S207.

In step S211, the control unit 102 determines whether or not the content of settings is displayed in the voice setting display area 310 of the viewfinder unit 109. Upon determining that the content of settings is displayed in the voice setting display area 310 of the viewfinder unit 109, the control unit 102 advances processing to step S212. Upon determining that the content of settings is not displayed, the control unit 102 returns processing to step S207.

In step S212, the control unit 102 deactivates the content of settings displayed in the voice setting display area 310, and activates the content of settings displayed in the manual setting display area 302. Thus, the control unit 102 controls the image capture apparatus 100 according to the content of settings displayed in the manual setting display area 302.

In step S213, using the viewfinder control unit 103, the control unit 102 hides the content of settings displayed in the voice setting display area 310 of the viewfinder unit 109, and advances processing to step S207. The content of settings displayed in the voice setting display area 310 is hidden because the voice input settings can be merely temporary settings, and the settings manually input are regarded as permanent settings that match the user's intention.

By performing the processing in steps S210 to S213 described above, it is possible to easily restore the settings of the image capture apparatus 100 from the temporary voice input settings to the settings manually input.

Examples of Content Displayed by Viewfinder

Next, examples of content displayed by the viewfinder unit 109 according to the first embodiment will be described with reference to FIGS. 3A and 3B.

FIG. 3A shows an example of content displayed by the viewfinder unit 109 at the start of shooting in step S200 in FIG. 2.

The viewfinder unit 109 includes an object display area 301, the manual setting display area 302, and the voice setting display area 310.

The object display area 301 is an area for displaying image data captured by the image capturing unit 106 and generated by the control unit 102. The user can check the state of the object and the composition of the image by visually checking the image displayed in the object display area 301.

The manual setting display area 302 is an area for displaying items that can be manually set by the user using, for example, an operation member included in the operation unit 101. Each setting item shows information regarding the content of settings, such as a setting value or a picture (an icon) related to shooting. The present embodiment shows an example in which items manually set by the user are displayed in the manual setting display area 302. However, the items in the manual setting display area 302 need only be items set without using the speech recognition function. For example, the content of default settings of the image capture apparatus 100, the content of settings automatically generated by the image capture apparatus 100 in an automatic mode, or the like may be displayed therein. The manual setting display area 302 in FIG. 3A shows items manually set by the user, for example.

An item 3021 indicates the focus mode manually set by the user. An item 3022 indicates the metering mode manually set by the user. An item 3023 indicates the ON/OFF setting of the flash manually set by the user. An item 3024 indicates the shutter speed manually set by the user. An item 3025 indicates the aperture value manually set by the user. An item 3026 indicates the exposure correction value manually set by the user. An item 3027 indicates the ISO sensitivity manually set by the user. An item 3028 indicates the number of pictures that can currently be taken. An item 3029 indicates the current battery level.

Although the present embodiment shows nine items, it suffices if at least one item is input via voice.

An object 303 is the shooting target that is to be photographed by the user.

Next, through steps S201 to S206 in FIG. 2, if the settings of the image capture apparatus 100 are temporarily changed by the user inputting voice in a state where the user has brought their eye close to the viewfinder unit 109, the content displayed by the viewfinder unit 109 changes from that shown in FIG. 3A to that shown in FIG. 3B.

FIG. 3B shows an example of content displayed by the viewfinder unit 109 in step S206 in FIG. 2. The same display items as in FIG. 3A are assigned the same reference numerals and descriptions thereof are omitted.

The voice setting display area 310 is an area in which the setting items and the content of voice input settings in steps S201 to S206 in FIG. 2 are displayed. The voice setting display area 310 in FIG. 3B shows an example of the content of voice input settings by the user.

An item 3111 indicates the focus mode set (changed) by voice input. An item 3112 indicates the exposure correction value set (changed) by voice input. An item 3113 indicates the ISO sensitivity set (changed) by voice input. An item 3114 indicates the metering mode set (changed) by voice input. An item 3115 indicates the shutter speed set (changed) by voice input.

As shown in FIG. 3B, if the manual setting display area 302 and the voice setting display area 310 show settings of the same category, the settings in the manual setting display area 302 are deactivated regarding the settings of the category, and the settings in the voice setting display area 310 are activated. For example, the focus mode manually set (the item 3021) is deactivated, and the focus mode set by voice input (the item 3111) is activated. This is because it is envisioned that, in shooting immediately after voice input, preferably using the settings changed by voice input matches the user's intention.

Also, in the example shown in FIG. 3B, items displayed in the manual setting display area 302 are activated if they are not displayed in the voice setting display area 310. For example, the flash settings (the item 3023) and the aperture value (the item 3025) manually set are active.

The user performs shooting in steps S207 and S208 in a state where the content of voice input settings is displayed in the voice setting display area 310 as shown in FIG. 3B, and thus the user can perform shooting using the content of voice input settings.

Also, in a case where the content of voice input settings is displayed in the voice setting display area 310, if a predetermined period of time has elapsed from when the user has moved their eye away from the viewfinder unit 109, the processing in steps S210 to S213 is performed. If this is the case, the contend displayed by the viewfinder unit 109 returns from that shown in FIG. 3B to that shown in FIG.

3A. This is because it is envisaged that content of settings changed by voice input is merely temporary, and the content of settings manually set is the permanent content of settings that matches the user's intention.

Through such control, it is possible to easily return the settings of the image capture apparatus 100 from the temporary voice input settings to the settings manually set.

The image capture apparatus 100 according to the present embodiment detects the eye approach state with respect to the viewfinder unit 109, and the speech recognition function is activated in the eye approach state so that the user is less often required to perform touch typing in order to change the settings at the time of shooting, which allows the user to perform shooting without stress.

Note that the image capture apparatus 100 may be provided with a liquid crystal panel or the like (not shown) in addition to the viewfinder unit 109. In a non-eye approach state in which the user's eye is not close to the viewfinder unit 109, the same content as in FIGS. 3A and 3B may be displayed in the liquid crystal panel (not shown).

Also, the arrangement of the object display area 301, the manual setting display area 302, and the voice setting display area 310 is not limited to that shown in FIGS. 3A and 3B. For example, it is possible to employ a layout in which the manual setting display area 302 and the voice setting display area 310 are separately arranged on the left side and the right side or on the upper side and the lower side in the viewfinder unit 109.

Also, the manual setting display area 302 and the voice setting display area 310 may or may not overlap the object display area 301. For example, in FIG. 3B, the voice setting display area 310 overlaps the object display area 301, but the manual setting display area 302 does not.

Furthermore, an area that overlaps the object display area 301, of the manual setting display area 302 or the voice setting display area 310 may be transparent so that the image of the object display area 301 can be seen through the area. Alternatively, the overlapping area may be fully transparent because the user need only visually check the displayed settings.

Second Embodiment

The following describes a second embodiment with reference to FIGS. 4 to 7.

Figure 4:
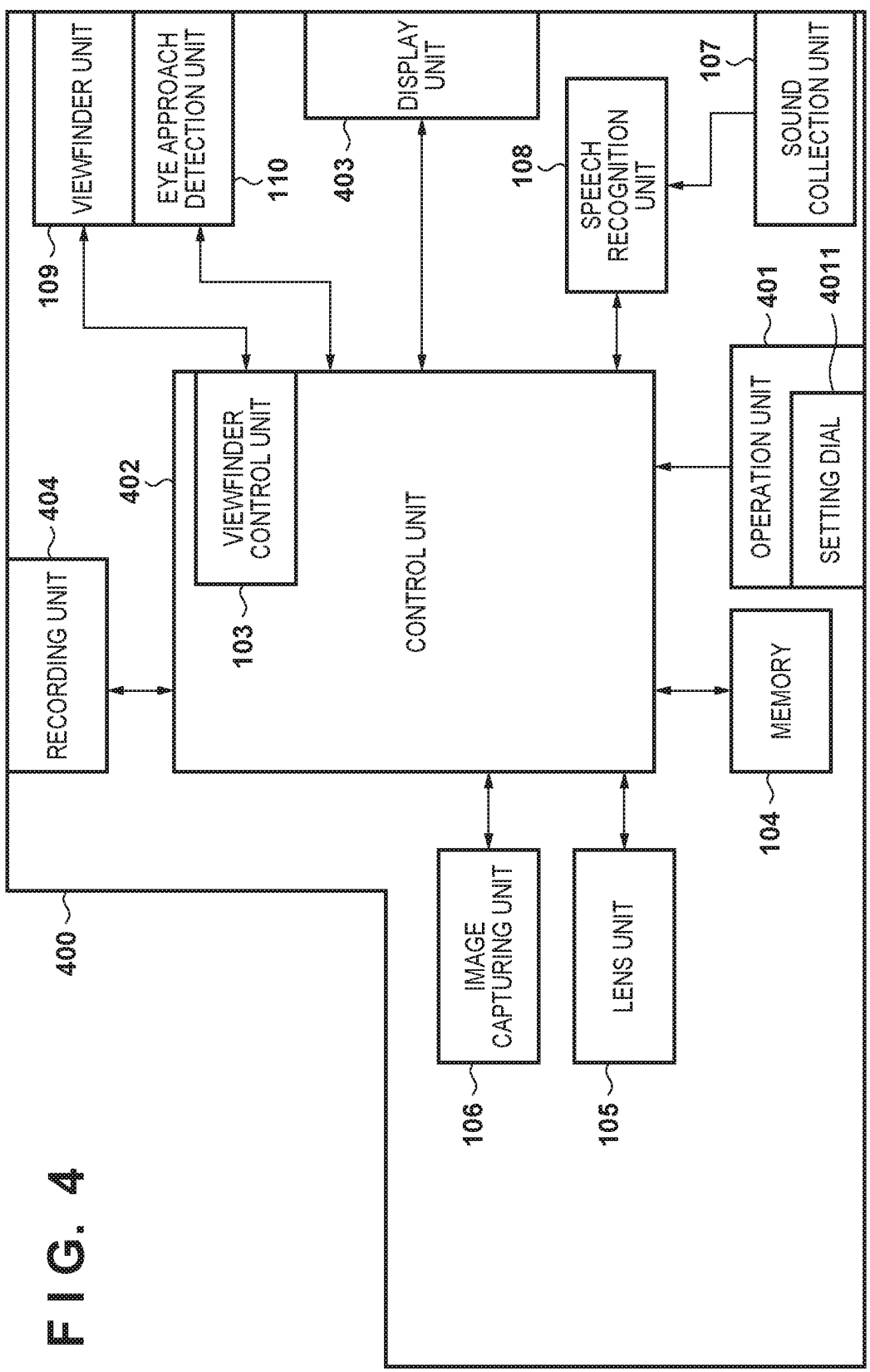
FIG. 4 is a block diagram showing an apparatus configuration according to a second embodiment.

First, an image capture apparatus 400 according to the second embodiment will be described with reference to FIG. 4.

The image capture apparatus 400 includes an operation unit 401, a control unit 402, a display unit 403, and a recording unit 404. The image capture apparatus 400 also includes the viewfinder control unit 103, the memory 104, the lens unit 105, the image capturing unit 106, the sound collection unit 107, the speech recognition unit 108, the viewfinder unit 109, and the eye approach detection unit 110, which are components that are the same as those of the image capture apparatus 100 according to the first embodiment.

In the following, the components that are the same as those of the image capture apparatus 100 according to the first embodiment are assigned the same reference numerals, the descriptions thereof are omitted, and different components are mainly described.

The operation unit 401 has the same function as the operation unit 101 according to the first embodiment, and additionally includes a setting dial 4011 for setting the image capture apparatus 400 upon a physical position being selected through a user operation. The setting dial 4011 is a rotatable operation member that is used to switch the settings of the image capture apparatus 400. The user can change the focus mode and so on by rotating the setting dial 4011 and selecting a desired setting position.

The control unit 402 has the same function as the control unit 102 according to the first embodiment, and additionally records image data captured by the image capturing unit 106 and subjected to image processing, on the recording unit 404. The control unit 402 adds the settings used at the time of shooting, and metadata indicating whether the settings have been manually set or set by voice input, to the image data, and records the image data. The control unit 402 performs image reproduction processing to read out image data recorded on the recording unit 404 and display the image data on the display unit 403.

The display unit 403 is constituted by a liquid crystal panel, an organic EL panel, or the like, and reproduces and displays image data recorded on the recording unit 404. The user selects a desired image from a list of images displayed on the display unit 403, via the operation unit 401, and thus the selected image is displayed on the display unit 403. The display unit 403 also has the function of notifying the user.

The recording unit 404 is a recording medium such as a memory card or a hard disk (not shown), and records image data generated by the control unit 402.

Operations at the Time of Shooting

Figure 5A:
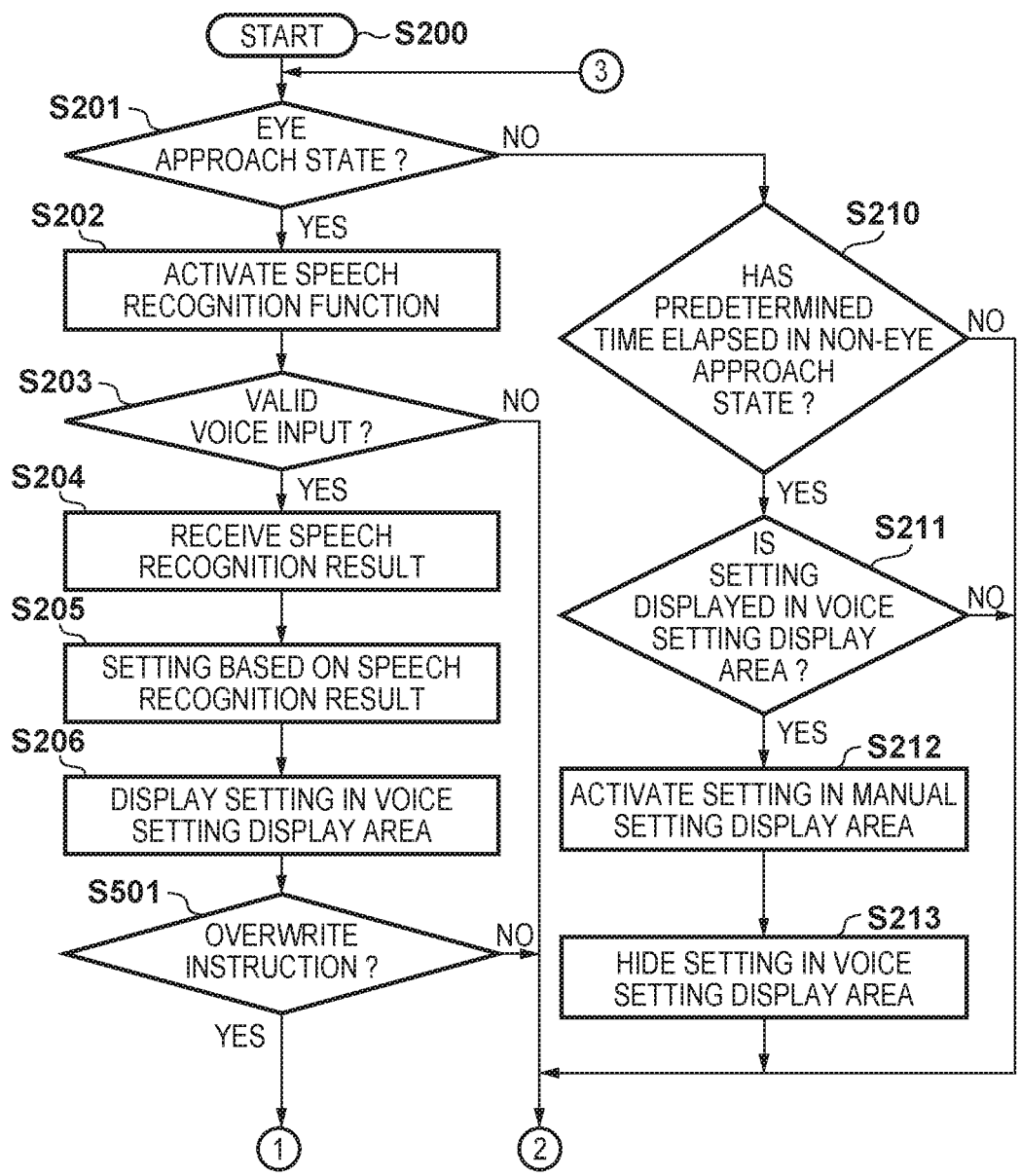
FIGS. 5A and 5B are flowcharts showing processing performed at the time of shooting according to the second embodiment.

Next, processing performed at the time of shooting according to the second embodiment will be described with reference to FIGS. 5A and 5B.

In the following description, the processing steps that are the same as those in FIG. 2 according to the first embodiment are assigned the same step number, descriptions thereof are omitted, and different processing steps are mainly described. Also, in the processing shown in FIGS. 5A and 5B, the operation unit 101 and the control unit 102 according to the first embodiment are replaced with the operation unit 401 and the control unit 402 in the present embodiment, respectively.

In the following description, each component connected to the control unit 402 operates in response to a control signal received from the control unit 402, unless otherwise specifically described.

Steps S200 to S206 are the same as those in FIG. 2.

In step S501, the control unit 402 determines whether or not a user instruction to overwrite the content of settings displayed in the manual setting display area 302 with the content of settings displayed in the voice setting display area 310 has been received. Upon determining that such an instruction has been input, the control unit 402 advances processing to step S502, and upon determining that such an instruction has not been input, the control unit 402 advances processing to step S207.

The user can replace the content of settings displayed in the manual setting display area 302 with the content of settings displayed in the voice setting display area 310 by performing a predetermined operation using the operation unit 401. The predetermined operation may be any operation as long as it is an operation performed to overwrite the content of settings, such as speaking predetermined words (e.g. "overwrite the settings") (inputting voice), or long-pressing or double-pressing a predetermined button on the operation unit 401.

The image capture apparatus 400 is enabled to accept such an operation performed to overwrite the content of settings, and therefore it is possible to set the temporary voice input settings as permanent content of settings of the image capture apparatus 400 through an easy operation.

In step S502, the control unit 402 determines whether or not the content of settings displayed in the voice setting display area 310 conflicts or contradicts (in the following description, contradicts) with the content of settings selected using the setting dial 4011. Upon determining that there is no contradiction, the control unit 402 advances processing to step S503, and upon determining that there is a contradiction, the control unit 402 advances processing to step S511. For example, "AF (autofocus mode)" is set as the focus mode (the item 3021), using the setting dial 4011. In this case, if the focus mode set by voice input (the item 3111) is "MF (manual focus mode)" as shown in FIG. 3B, it is determined that there is a contradiction.

In step S503, the content of settings set using the setting dial 4011 and the content of voice input settings do not contradict with each other, and therefore the control unit 402 overwrites the content of settings displayed in the manual setting display area 302 with the content of settings displayed in the voice setting display area 310 which is to be displayed.

In step S504, the control unit 402 hides the content of settings displayed in the voice setting display area 310. Upon the processing in steps S503 and S504 being complete, the content displayed by the viewfinder unit 109 changes from that shown in FIG. 3B to that shown in FIG. 6A.

Figure 5B:
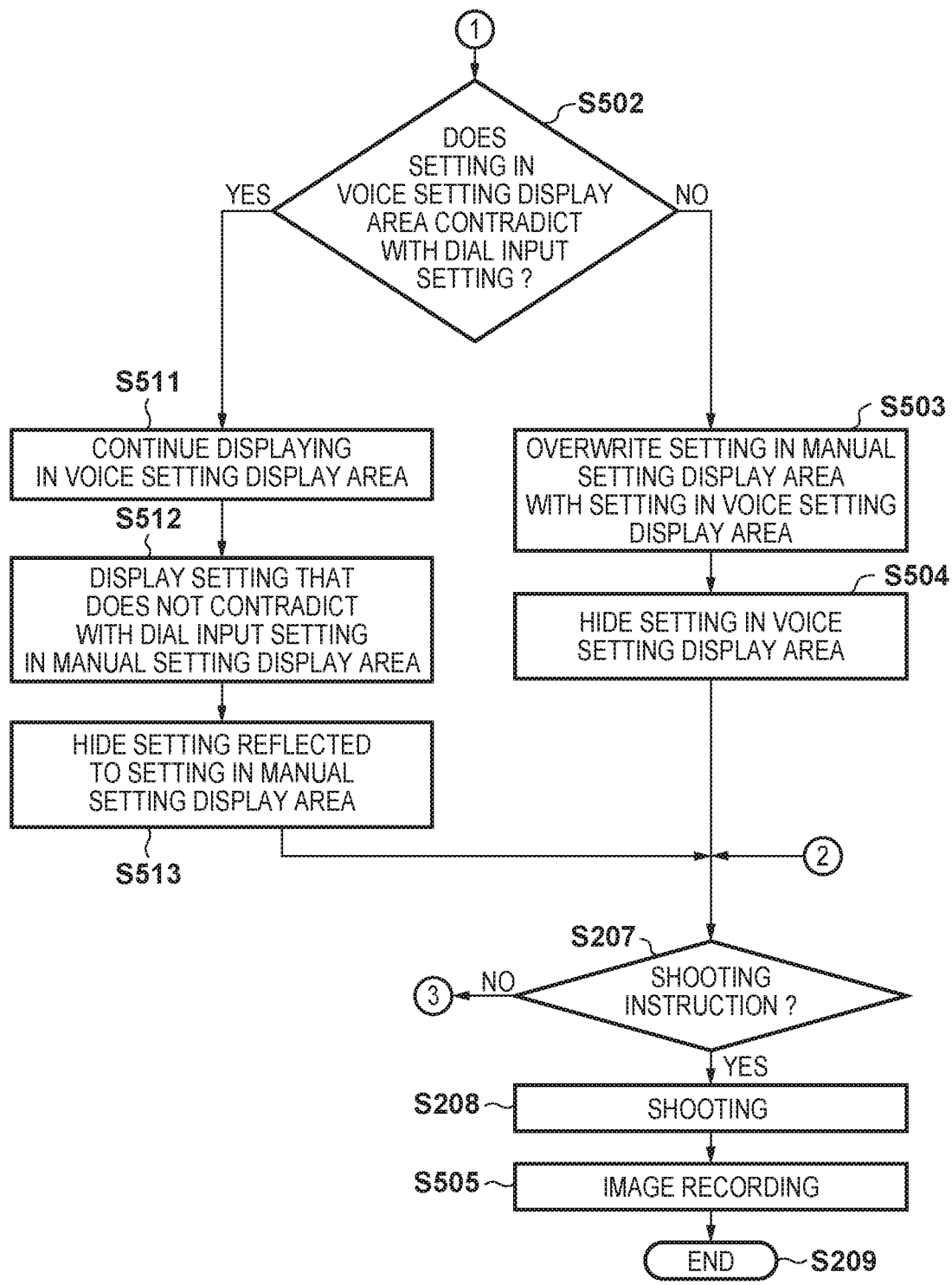
Figure 6A:
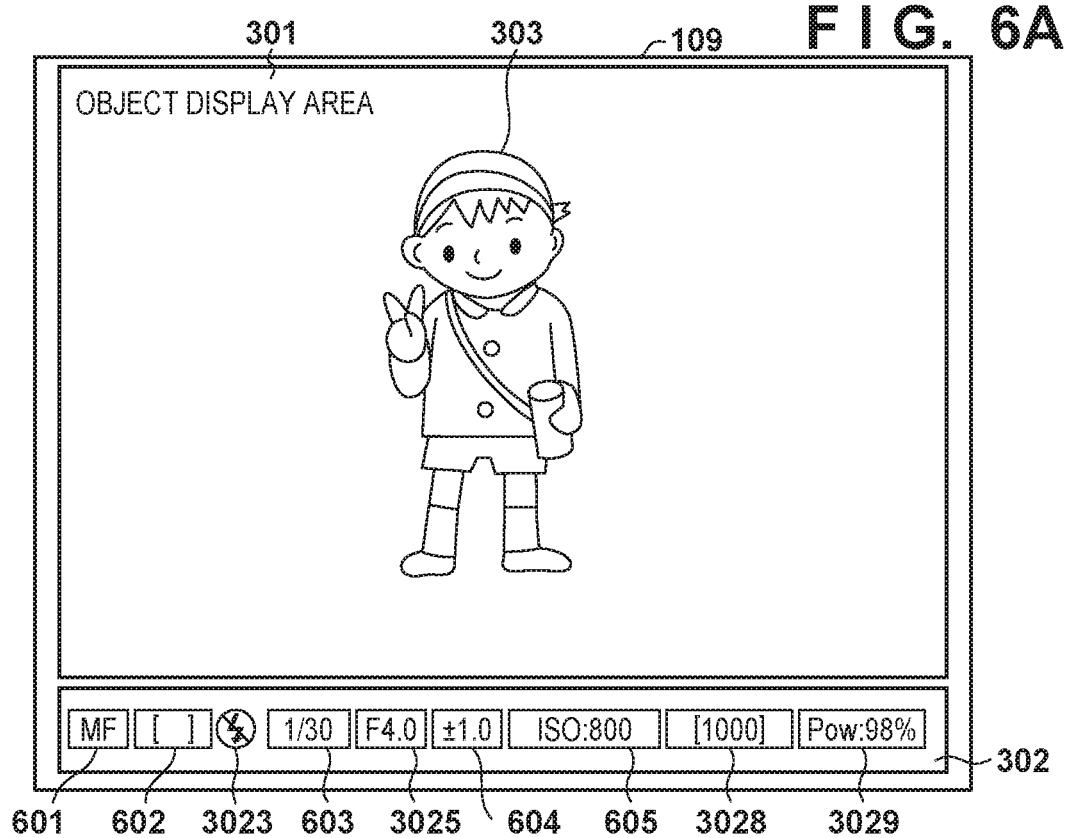
FIGS. 6A and 6B are diagrams showing examples of content displayed by a viewfinder according to the second embodiment.

FIG. 6A shows an example of content displayed by the viewfinder unit 109 in step S504 in FIG. 5B. The same display items as in FIG. 3A are assigned the same reference numerals and descriptions thereof are omitted.

An item 601 indicates the content of settings where the focus mode manually set has been overwritten with the focus mode set by voice input.

An item 602 indicates the content of settings where the metering mode manually set has been overwritten with the metering mode set by voice input.

An item 603 indicates the content of settings where the shutter speed manually set has been overwritten with the shutter speed set by voice input.

An item 604 indicates the content of settings where the exposure correction value manually set has been overwritten with the exposure correction value set by voice input.

An item 605 indicates the content of settings where the ISO sensitivity manually set has been overwritten with the ISO sensitivity set by voice input.

Through such control, it is possible to easily change the content of settings of the image capture apparatus 100 manually set, to the content of settings set by voice input.

In step S511, the control unit 402 continues displaying the content in the voice setting display area 310 because the content of settings selected using the setting dial 4011 contradict with the content of voice input settings, and the content of voice input settings cannot be reflected without change.

In step S512, voice input setting items and do not contradict with the content of settings selected using the setting dial 4011 can be reflected without change, and therefore the control unit 402 displays such setting items, displayed in the voice setting display area 310, in the manual setting display area 302.

In step S513, the control unit 402 hides the setting items that have been reflected to the content of settings displayed in the manual setting display area 302 in step S512, from among the setting items displayed in the voice setting display area 310.

Figure 6B:
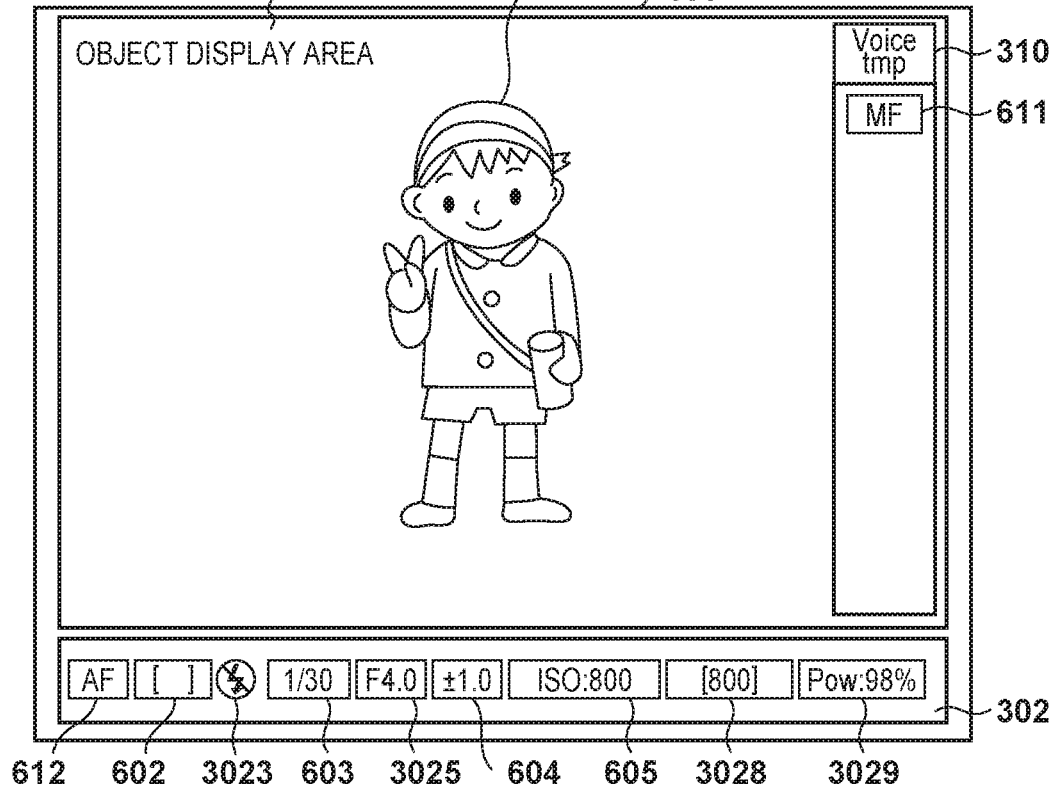

Upon the processing in steps S511 to S513 being complete, the content displayed by the viewfinder unit 109 changes from that shown in FIG. 3B to that shown in FIG. 6B.

FIG. 6B shows an example of content displayed by the viewfinder unit 109 in step S513 in FIG. 5B. The same display items as in FIG. 6A are assigned the same reference numerals and descriptions thereof are omitted.

An item 611 indicates the focus mode set by voice input.

An item 612 indicates the focus mode selected using the setting dial 4011.

Here, the focus mode set by voice input (the item 611) contradicted with the focus mode selected using the setting dial 4011 (the item 612), and the item 612 in the manual setting display area 302 could not be overwritten with the item 611. Therefore, the item 611 remains in the voice setting display area 310.

Therefore, the user can easily discern a setting item that contradicted with the manually set setting item and could not be used to change the settings of the image capture apparatus 400, from among the voice input setting items.

Steps S207 to S208 are the same as those in FIG. 2.

In step S505, the control unit 402 records the image data obtained in step S208, on the recording unit 404. In this case, the control unit 402 can add various kinds of metadata to the image data. The control unit 402 additionally records, to the metadata, information indicating whether the settings employed at the time the image data was captured were the settings displayed in the manual setting display area 302 or the settings displayed in the voice setting display area 310.

Step S209 is the same as that in FIG. 2.

Through such control, when reproducing an image, the user can easily discern whether or not the image was captured using the content of voice input settings.

Processing at the Time of Image Reproduction

Next, processing performed by the image capture apparatus 400 at the time of reproducing an image will be described with reference to FIG. 7.

In step S700, the operation unit 401 receives an instruction to reproduce an image, from the user, and the control unit 402 starts image reproduction processing.

In step S701, the control unit 402 reads out image data and metadata added to the image data, from the recording unit 404.

In step S702, the control unit 402 displays the image data read out from the recording unit 404, on the display unit 403.

In step S703, the control unit 402 determines whether or not the metadata of the image data read out from the recording unit 404 includes data that was recorded in step S505 of FIG. 5B and indicates a setting item that was displayed in the voice setting display area 310. Upon determining that there is data that indicates a setting item that was displayed in the voice setting display area 310, the control unit 402 advances processing to step S704, and otherwise advances processing to step S710.

In step S704, the control unit 402 displays, on the display unit 403, options that can be selected by the user, regarding whether or not to activate the setting item displayed in the voice setting display area 310, read out in step S703, as a current setting of the image capture apparatus 400.

In step S705, the control unit 402 determines whether or not the user has selected "activate" from the options displayed in step S704. Upon determining that "activate" has been selected, the control unit 402 advances processing to step S706, and upon determining that "not activate" has been selected, the control unit 402 advances processing to step S710.

In step S706, the control unit 402 determines whether or not the setting item that is to be activated contradicts with the content of settings set using the setting dial 4011. If there is a contradiction, the control unit 402 advances processing to step S707, and otherwise advances processing to step S708.

In step S707, there is no contradiction in the content of settings in step S706, and the control unit 402 activates the voice input setting item and recorded to metadata, and reflects the setting item to the current settings of the image capture apparatus 400. In this case, the contents of settings do not contradict each other, and therefore, as the user intended, the current content of settings of the image capture apparatus 400 can be replaced with the content of voice input settings.

In step S708, the contents of settings contradict each other in step S706, and therefore the control unit 402 only activates a setting item that does not contract with the setting item set using the setting dial 4011 at the time of reproduction, from among the voice input setting items and recorded in metadata. In this case, the contents of settings contradict each other, and contrary to the user's intention, there is a voice input setting item but not reflected to the current settings of the image capture apparatus 400.

In step S709, the control unit 402 displays, on the display unit 403, information indicating that the voice input setting items and recorded in metadata included a setting item that contradicts with the content of settings set using the setting dial 4011 at the time of image reproduction, and could not be activated, to notify the user. In this way, the user can check what voice input setting item could not be reflected to the current settings of the image capture apparatus 400.

In step S710, the control unit 402 terminates image reproduction processing.

The user can reproduce an image captured using the temporary voice input settings, and check whether or not the content of settings is acceptable. If the content of settings is acceptable, the user can easily reflect the content of settings to the current settings of the image capture apparatus 400.

Figure 7:
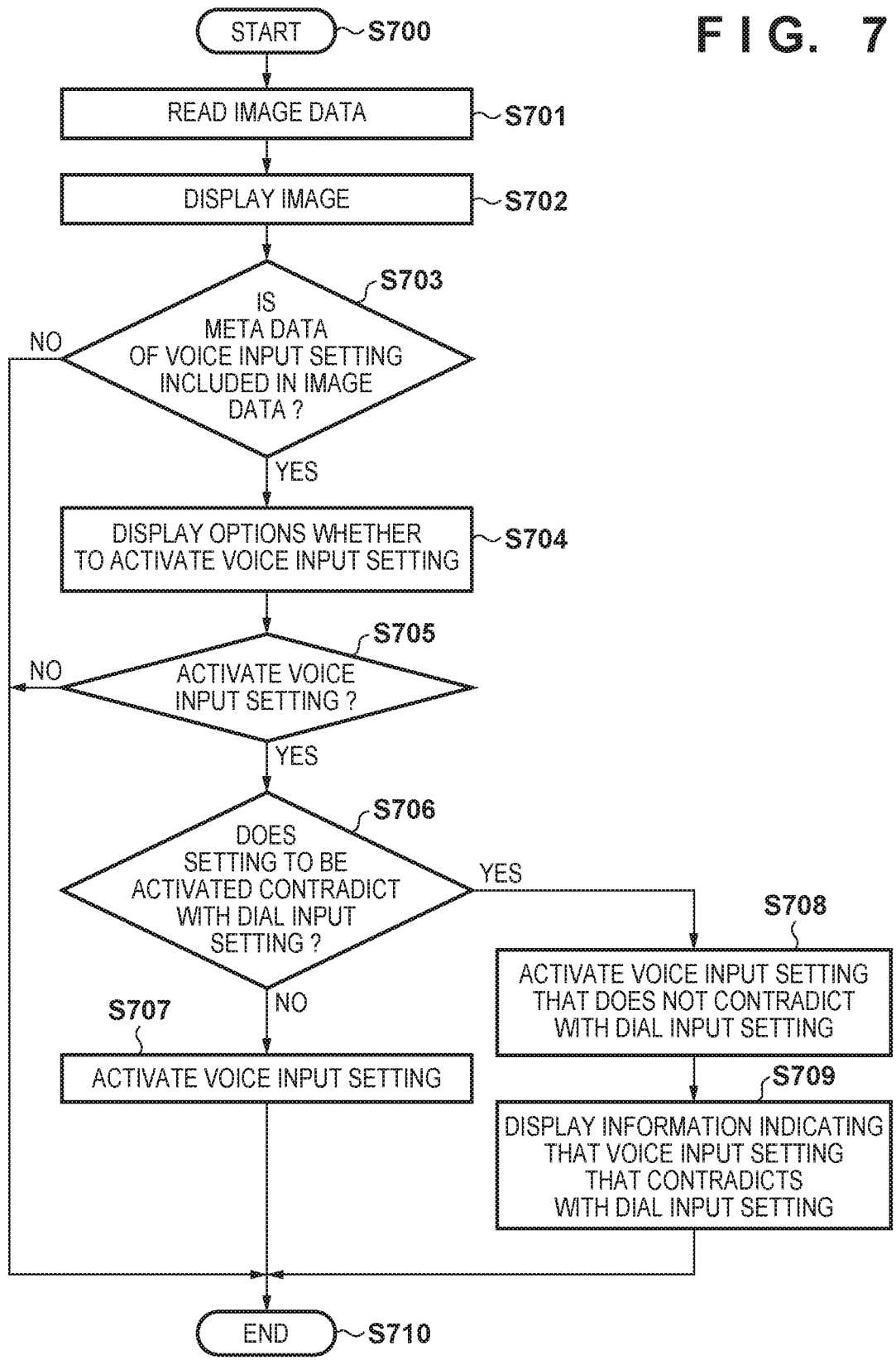
FIG. 7 is a flowchart showing processing performed at the time of image reproduction according to the second embodiment.

Here, the options in step S704 in FIG. 7 and the notification in step S709 are not necessarily displayed on the display unit 403, and may be output as a sound from a speaker (not shown).

As described above, according to the present embodiment, upon the user entering the eye approach state, the speech recognition function of the image capture apparatus 400 is activated. Therefore, the user can perform shooting or making voice input settings, and the user is less often required to perform touch typing in order to change the settings at the time of shooting, which allows the user to perform shooting without stress.

Also, by explicitly distinguishing between the content of voice input settings and the content of settings manually input when displaying them on the viewfinder to which the user has brought their eye close, it is possible to enable the user to recognize which content of settings is currently employed as the settings of the image capture apparatus 400. Also, it is possible to easily reflect the content of voice input settings to the current settings of the image capture apparatus 400 if the user wishes to do so.

Also, by explicitly distinguishing between the content of voice input settings and the content of settings manually input when recording them in the metadata of image data, it is possible to enable the user to easily reflect the content of voice input settings to the current settings of the image capture apparatus 400 when reproducing image data captured using the content of voice input settings.

Also, as in the first embodiment, FIGS. 6A and 6B, which show the content displayed by the viewfinder unit 109, are examples, and the present invention is not limited thereto.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-051509, filed Mar. 19, 2019 which is hereby incorporated by reference herein in its entirety.

What is claimed is:

1. An image capture apparatus having a speech recognition function, comprising:
   a display;
   a detector;
   an operation unit; and
   one or more processors configured to function as a control unit,
   wherein the control unit is configured to, when the detector has detected an eye contact state in which an eye of a user is within a predetermined distance of the display before the speech recognition function is activated, set the speech recognition function to be activated,
   wherein the control unit determines an instruction corresponding to an input voice by the speech recognition function with respect to a reception of the voice input and executes a control according to the instruction determined by the speech recognition function.

2. The apparatus according to claim 1,
   wherein the display has a first display area for displaying a first content of settings that has been set without using the speech recognition function, and a second display area for displaying a second content of settings that has been set according to speech recognized using the speech recognition function.

3. The apparatus according to claim 2, wherein, in a state where the second content of settings is displayed in the second display area, upon a predetermined period of time elapsing from when the detector no longer detects the eye contact state, the control unit deactivates the second content of settings, hides the second content of settings, and activates the first content of settings.

4. The apparatus according to claim 2, wherein, in a state where the second content of settings is displayed in the second display area, upon a predetermined instruction being accepted, the control unit replaces the first content of settings displayed in the first display area with the second content of settings displayed in the second display area, and hides the second content of settings displayed in the second display area.

5. The apparatus according to claim 4, wherein the control unit makes settings of the image capture apparatus by selecting a physical position according to a user operation, wherein, when the second content of settings displayed in the second display area and the first content of settings set by the control unit contradict with each other, the control unit continues displaying the second content of settings in the second display area without replacing the first content of settings with the second content of settings.

6. The apparatus according to claim 5, further comprising: an image capturing unit; and a recording medium configured to record image data captured by the image capturing unit, wherein, when the image capture apparatus captures an image using the image capturing unit according to the second content of settings, the control unit adds the second content of settings to the captured image data, and records the captured image data on the recording medium.

7. The apparatus according to claim 6, wherein the processor functions as a reproduction unit configured to reproduce image data recorded on the recording medium, wherein the control unit references the second content of settings added to the image data read out by the reproduction unit from the recording medium, and determines whether or not to activate the second content of settings added to the image data, so as to be applied to the current settings of the image capture apparatus.

8. The apparatus according to claim 7, wherein, upon determining that the second content of settings added to the image data is to be activated so as to be applied to the current settings of the image capture apparatus, the control unit activates a setting item that does not contradict with the first content of settings set by the control unit, of the second content of settings, continues displaying the second content of settings that contradicts with the first content of settings set by the control unit, and notifies the user of a setting item that contradicts with the first content of settings set by the control unit, of the second content of settings.

9. The apparatus according to claim 2, wherein the first content of settings includes a setting item manually set through a user operation.

10. A method of controlling an image capture apparatus having a speech recognition function, a display, a detector, and an operation unit, the method comprising:
when the detector has detected an eye contact state in which an eye of a user is within a predetermined distance of the display before the speech recognition function is activated, setting the speech recognition function to be activated;
determining an instruction corresponding to an input voice by the speech recognition function with respect to a reception of a voice input; and
executing a control according to the instruction determined by the speech recognition function.

11. A non-transitory computer-readable storage medium storing a program that causes a computer to execute a method of controlling an image capture apparatus having a speech recognition function, a display, a detector, and an operation unit, the method comprising:
when the detector has detected an eye contact state in which an eye of a user is within a predetermined distance of the display before the speech recognition function is activated, setting the speech recognition function to be activated;
determining an instruction corresponding to an input voice by the speech recognition function with respect to a reception of a voice input; and
executing a control according to the instruction determined by the speech recognition function.

* * * * *